United States Patent [19]

Davis

[11] 4,426,285
[45] * Jan. 17, 1984

[54] WATER SOFTENING AND TREATMENT SYSTEM

[75] Inventor: Stephen H. Davis, Middletown, Ohio

[73] Assignee: Water Refining Company, Middleton, Ohio

[*] Notice: The portion of the term of this patent subsequent to Sep. 15, 1998 has been disclaimed.

[21] Appl. No.: 392,826

[22] Filed: Jun. 28, 1982

[51] Int. Cl.$^1$ .............................................. B01D 57/00
[52] U.S. Cl. ................................... 210/109; 210/136; 210/256; 210/321.1
[58] Field of Search ......................... 210/638, 652–655, 210/663, 116, 119, 128, 256, 257.1, 257.2, 259–261, 266, 287–289, 294, 321.1, 109, 136

[56] References Cited

U.S. PATENT DOCUMENTS

| | | | |
|---|---|---|---|
| 3,493,496 | 2/1970 | Bray et al. | 210/116 |
| 4,160,727 | 7/1979 | Harris | 210/259 |
| 4,218,317 | 8/1980 | Kirschmann | 210/117 |
| 4,289,617 | 9/1981 | Davis | 210/109 |

*Primary Examiner*—Ivars C. Cintins
*Attorney, Agent, or Firm*—Neuman, Williams, Anderson & Olson

[57] ABSTRACT

A system for the combined softening of water and reduction of dissolved solids from the water, which can be retrofitted to a conventional water softening apparatus, includes a pressure tank, an inlet line for conveying raw or hard water to the pressure tank, and an outlet line for conveying softened water from the tank. Treatment material is located within the pressure tank for softening the water within the tank. At least one semipermeable reverse osmosis membrane element is embedded within the treatment material for filtering the softened water within the pressure tank. A collection conduit and holding tank communicates with the membrane element and conveys filtered water from the pressure tank and stores the water.

9 Claims, 5 Drawing Figures

WATER SOFTENING AND TREATMENT SYSTEM

BACKGROUND OF THE INVENTION

1. Field of the Invention

The present invention relates to water treating devices and, more particularly, to a system in which hard water is softened and a reduction in the dissolved solids in the water is obtained.

2. Prior Art

Water softener systems presently in use are of the type in which hard, raw water enters the top of a pressure tank through an inlet line, percolates through a bed of treatment material, such as zeolite, and passes out of the pressure tank through an outlet line having a mouth located proximate the bottom of the tank. As the hard water percolates through the zeolite bed, an ion exchange occurs in which sodium ions held by the zeolite are exchanged for the "hard" metal ions in the water.

The water softening ability of the zeolite bed is gradually reduced through use and, after a predetermined quantity of hard water has been softened, the zeolite bed becomes depleted of sodium ions. The zeolite bed is thereafter regenerated by passing a brine solution through it so that the ion exchange process is reversed.

Reverse osmosis water treatment systems are known in the art in which water is filtered by passing through a semi-permeable membrane carried on a rigid structure, such as a perforated metal tube, and then is collected in a holding tank. Such a system is disclosed, for example, in U.S. Pat. No. 3,493,496, issued May 13, 1968, to Bray et al. Bray discloses a semi-permeable membrane element which comprises a porous fabric enclosed in a semi-permeable membrane material and wrapped in a spiral about a perforated tube. A plastic screen is positioned adjacent the membrane material so that it forms spaces between successive layers of the wrapped membrane to permit fluid flow across the surface of the wrapped membrane material.

The spirally wrapped membrane typically is positioned within a vessel and includes a fluid conduit connected to the perforated tube which conveys treated water to a holding tank or fluid dispensing means. The vessel also includes a raw water inlet and a bleed water outlet. Raw water washes past the membrane surface continually and is removed through the bleed water outlet carrying with it dissolved solids which could not pass through the semi-permeable membrane.

A disadvantage of typical reverse osmosis treatment systems is that small particulate contaminants may collect on the surfaces of the membranes to restrict the flow of fluid through the membrane material, thus necessitating a pretreatment filter. Such a filter may become clogged and, therefore, require cleaning from time to time. Furthermore, such water treatment systems require a pressure vessel for the reverse osmosis system which is separate from the remainder of the water treatment devices which may also be in use. This adds to the complexity, cost, and space required for the combined system.

Accordingly, there is a need for a water softening and treatment system in which hard, raw water is softened and dissolved solids or other impurities removed therefrom within a single pressure tank. Furthermore, there is a need for a water softening and treatment system which is relatively easy to maintain and in which a pretreatment filter is not required.

SUMMARY OF THE INVENTION

The present invention provides a water softening and treatment system in which at least one semi-permeable membrane treatment device is embedded in treatment material within a pressure tank. Hard, raw water entering the pressure tank is softened through an ion exchange process with a bed of treatment material and is then filtered through the semi-permeable membrane element. The treated water is conveyed to a holding tank which may be remotely located from the pressure tank. The system of the present invention possesses several advantages over a water softening system which is separate and distinct from a semi-permeable membrane filtering system. For example, the treatment material within the pressure tank acts as a gross filter to trap large contaminant particles which would otherwise clog the reverse osmosis semi-permeable membrane treatment device and prevent efficient filtration of the water.

An additional advantage of the system of the present invention is that an existing water softening pressure tank can be modified to accept the semi-permeable membrane treatment device, thereby reducing the overall size of the combined systems and the cost involved in obtaining treated and softened water. The membrane element preferably is sized to fit through the access opening in the top of the pressure tank so that it may be pushed through the opening to be embedded in the treatment material. The invention preferably also includes a substitute closure for the access opening which supports a conduit for conveying the treated water to a remote holding tank.

The present invention is a water softening and treatment system which comprises a pressure tank, an inlet line for conveying raw water to the interior of the pressure tank, an outlet line for conveying softened water from the tank, treatment material located within the tank for softening raw water within the tank, at least one semi-permeable reverse osmosis membrane element embedded within the treatment material, and a water conduit for conveying treated water from the membrane element to a holding tank.

In a preferred embodiment of the invention, the reverse osmosis membrane element comprises a porous tubular member communicating with the water conduit, a semi-permeable reverse osmosis membrane assembly spirally wrapped about the tubular member to form a generally cylindrical shape and including a spacing member separating layers of the spirally wrapped membrane assembly, and a bottom cap covering an end of the membrane element. The bottom cap includes an inlet valve for selectively permitting fluid flow from the tank along the spacing member. The inlet valve is biased to a closed position by a resilient member to prevent fluid flow through the bottom cap and through the membrane element during the regeneration cycle of the water softening system while a brine solution is supplied to the tank. During the softening cycle of the water softening system the fluid pressure within the tank is higher than during the regeneration cycle. Accordingly, the resilient member is sized such that it permits the valve to be opened during the softening cycle in response to the higher fluid pressure.

It is also preferred to include a top cap which covers an end of the membrane element opposite the bottom cap and which defines a plenum for collecting brine or waste water which has not passed through the membrane. The top cap is joined to a waste water conduit which conveys the waste water from the pressure tank to a drain or other means of disposal. The waste water is rich in contaminants which have been filtered from the water passing through the membrane material.

Accordingly, it is an object of the present invention to provide a system within a single pressure tank in which raw, hard water is softened and particulates and other impurities suspended in the water are reduced to provide such a system which can be retrofitted to an existing water softening system; and to provide such a system in which the particulate water treatment material in the pressure tank of the softening system filters out large contaminant particles, thus eliminating the need for a separate pretreatment filter in the hard water line.

Other objects and advantages of the invention will be apparent from the following description, the accompanying drawings and the appended claims.

DESCRIPTION OF THE PREFERRED EMBODIMENT

Figure 1:
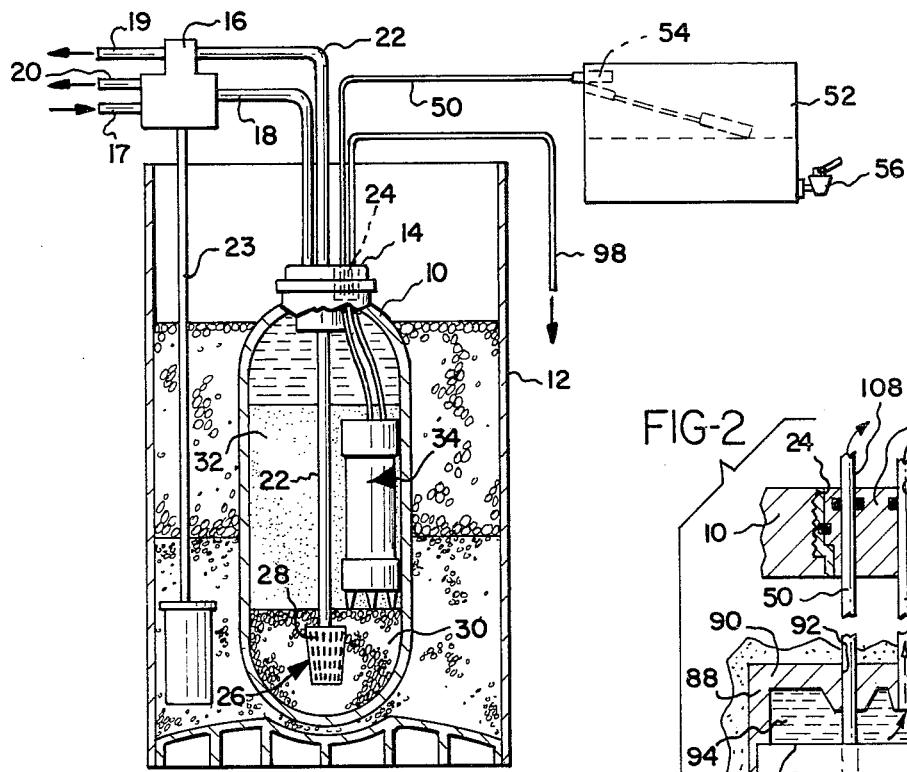
FIG. 1 shows somewhat schematically a side elevation in section of the water softening and treatment system of the present invention.

As shown in FIG. 1, the water softening and treatment system of the present invention employs a standard pressure tank 10 mounted within a brine tank 12. The pressure tank 10 is fitted with a closure 14 which seals the top of the tank. A valve mechanism 16 controls the flow of water through a raw water supply line 17, an inlet line 18, a softened water line 19, a drain line 20, an outlet line 22, and a brine solution feed line 23. Inlet line 18 and outlet line 22 pass through openings formed in the closure 14, which also defines an access opening 24 (also shown in FIG. 2).

The outlet line 22 extends from the valve mechanism 16 to a mouth portion 26 affixed with an outlet head 28 proximate the bottom of the pressure tank 10. The outlet head 28 is buried within a bed of gravel 30. The gravel bed 30 supports a bed of treatment material 32, preferably a granulated resin such as zeolite.

Embedded within the treatment material 32 is a semipermeable reverse osmosis membrane element means, generally designated 34. The reverse osmosis membrane element means 34 includes a spirally wrapped, semipermeable reverse osmosis membrane element 36. Membrane element 36 is of conventional design and includes a central perforated tube 38 about which is wrapped a semi-permeable reverse osmosis membrane assembly including membrane material 40 and a pad 42 made of felt or other material through which fluid may flow to the perforated tube. Pad 42 is sandwiched between two layers of membrane material 40 to form the membrane assembly. Successive windings of the spirally wrapped membrane assembly are separated by a spirally wrapped spacing member 46, preferably made of a corrugated plastic material or screen, which permit the flow of fluid upwardly past the membrane assembly so that the reverse osmosis process may occur along the entire length of the spirally wrapped membrane element 36. Another type of spirally wrapped membrane element suitable for use in the present invention is disclosed in Bray et al. U.S. Pat. No. 3,493,496.

The perforated tube 38 is closed at its lower end by a resilient plug 48, and its upper end is attached to a fluid collection conduit 50 which extends from the pressure tank 10 to a holding tank 52 located remotely from the pressure tank 10 and the brine tank 12 (FIG. 1). The collection conduit also includes a float valve 54 of conventional design which is mounted within the holding tank 52 and is utilized to regulate the fluid level within the holding tank. The holding tank 52 preferably includes a means for dispensing the fluid collected, such as a tap 56, also of conventional design.

Figure 3:
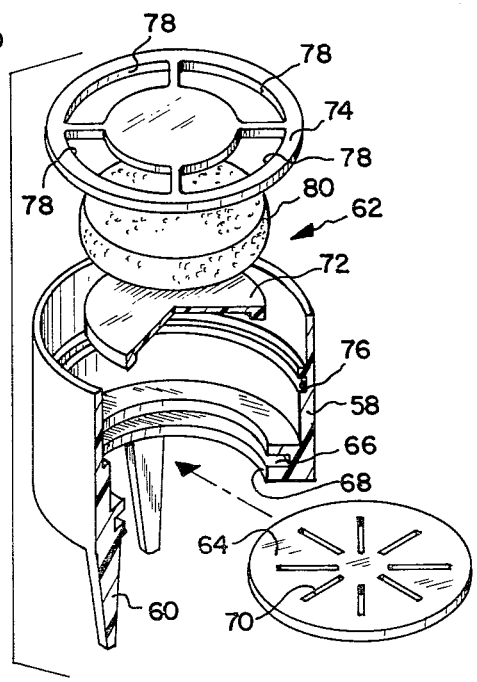
FIG. 3 is an exploded perspective view of the inlet valve of the membrane element shown in FIG. 2.
Figure 2:
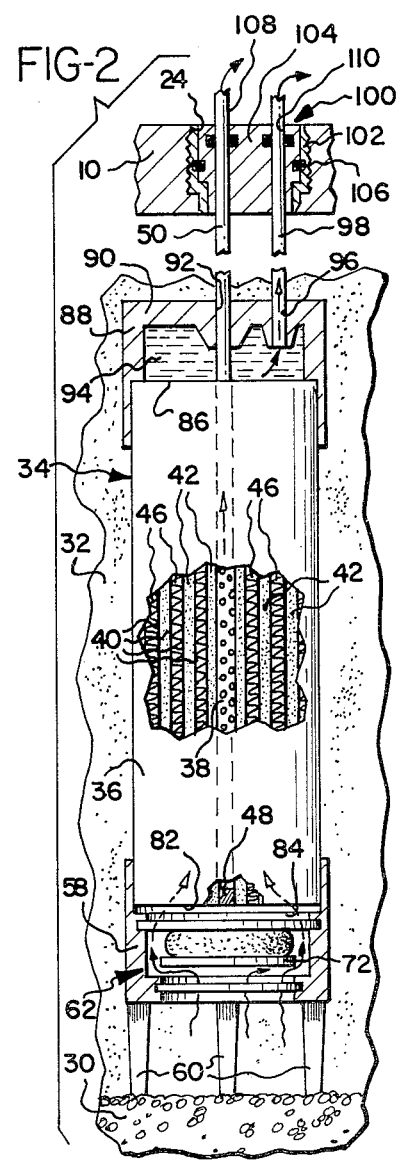
FIG. 2 is a side elevation, partially in section and partially broken away, of a membrane element of the system of FIG. 1.

As shown in FIGS. 2 and 3, the membrane element 36 is covered at its lower end by a bottom cap 58. Bottom cap 58 is generally cylindrical in shape and sized to slip over the outer periphery of the spirally wrapped membrane element 36. The bottom cap 58 includes legs 60 for supporting the membrane element 36 on the gravel bed 30. The bottom cap 58 also includes an inlet valve, generally designated 62.

Inlet valve 62 includes a lower perforated disk 64 which is mounted within an annular slot 66 formed about a lower inlet opening 68. The lower perforated disk 64 defines slots 70, which are sufficiently narrow to prevent the granulated treatment material 32 from entering and clogging the inlet valve 62 and the unit 34. An imperforate disk 72 is positioned within the bottom cap 58 so that it is superposed to the lower perforated disk 64 and has a diameter sufficient to cover the slots 70 when the imperforate disk rests upon the lower perforated disk.

An upper perforated disk 74 is positioned within an annular slot 76 formed in the bottom cap 58. The upper perforated disk 74 defines arcuate slots 78 which extend about its periphery. A cylindrically-shaped resilient member 80 is mounted within the bottom cap 58 and is positioned between the upper perforated disk 74 and the disk 72. The resilient member 80 has a thickness such that the disk 72 is urged against the upper surface of the lower perforated disk 64 and, below a predetermined flow pressure in a direction into the membrane element 36, maintains the inlet valve 62 in a closed position. The upper perforated disk 74 is positioned within the bottom cap 58 so that it is spaced apart from the lower end surface 82 of the membrane element 36, thereby forming an inlet plenum 84 (also shown in FIGS. 4 and 5).

As best shown in FIG. 2, the upper end surface 86 of the membrane element 36 is covered by a top cap 88. Top cap 88 is generally cylindrical in shape and includes a closed upper end 90 that defines a central opening 92 which receives the collection conduit 50 extending from the perforated tube 38. The upper end 90 of the top cap 88 is spaced from the upper end 86 of the membrane element 36 and thereby defines a waste water plenum 94 which collects fluid which has passed through the membrane element 36 along the length of the spacing membrane 46, and thus has become rich in particulate contaminants which have been filtered from the fluid passing through the membrane material 40. The upper end 90 defines an opening 96 which receives a waste water conduit 98 for conveying water collected within the waste water plenum 94 to a drain or other means of disposal (not shown).

As shown in FIG. 2, the access opening 24 of the pressure tank 10 is fitted with a threaded plug 100 that includes an outer threaded portion 102 which engages the walls of the access opening, and an inner portion 104 which is rotatably mounted to the outer portion. The outer portion 102 and inner portion 104 of the plug 100 define a gasket recess which receives an O-ring 106 or other gasket means to prevent leakage of fluid from the pressure tank 10. The inner portion 104 of the plug 100 defines an opening 108 which receives the collection conduit 50, and an opening 110 which receives the waste water conduit 98. The outer threaded portion 102 preferably includes means (not shown) of conventional design, such as a raised hex head, which facilitates the attachment and removal of the plug 100 from the access opening 24. As the outer portion 102 is rotated so that the threads of the outer portion engage the threads of the access opening, the inner portion 104 does not rotate so that the conduits 50 and 98 passing through the openings 108 and 110 respectively, are not twisted.

The operation of the water softening and treatment system of the present invention is as follows. Hard, raw water under pressure enters the pressure tank 10 at its upper portion through the inlet line 18 and percolates downwardly through the treatment material 32 and the gravel bed 30 to the outlet head 28 of the outlet line 22. As the hard water passes through the treatment material 32, an ion exchange occurs and the hard water is softened.

Simultaneously, a portion of the softened water surrounding the reverse osmosis unit 34 is forced by the fluid pressure within the pressure tank 10 through the inlet valve 62. During this mode of operation, the inlet valve 62 assumes the open position shown in FIG. 5, since the pressure within the tank 10 is sufficient to overcome slight downward force applied to disk 72 by member 80. In the open position, the imperforate disk 72 is forced upwardly away from the lower perforated disk 64, thereby permitting fluid to flow upwardly through the slots 70, around the imperforate disk and through the openings 78 in the upper perforated disk 74. The soft water then enters the inlet plenum 84 where it may flow through the spacing member 46 along the length of the membrane element 36.

Softened water then flows through the membrane material 40 and along the pad 42, separating the membrane material, to the perforated tube 38, where it flows upwardly through the collection conduit 50 and is collected within the holding tank 52. No pumping mechanisms are required; the fluid pressure of the hard water entering pressure tank 10 is sufficient to force the softened water through the membrane element 36 and to the holding tank 52.

By the time the fluid passing through the spacing members 46 has reached the waste water plenum 94, it is rich in particulate contaminants and other material that has not passed through the membrane material 40. The fluid pressure in the plenum is sufficient to drive the fluid within the plenum through the waste water conduit 98 to a drain, thus ensuring a constant flow of fluid along the spacing members 46 of the membrane element 36.

After a period of use, large particulate contaminants in the hard water entering the pressure tank 10 through the inlet line 18 are collected by the treatment material 32, this material acting as a prefilter for the reverse osmosis element means 34. During the backwash cycle of the water softener, the valve mechanism 16 directs the flow of hard water through the outlet line 22 to enter the pressure tank 10 through the outlet head 28. The hard water thus percolates upwardly through the gravel bed 30 and the treatment material 32 to exit at the top of the pressure tank through the inlet line 18 and out the drain line 20. The large particulate contaminants entrapped by the treatment material, are flushed out of the pressure tank 10 through the inlet line 18 during this backwashing cycle. Thus the cleaning of a prefilter required with some prior art reverse osmosis systems is eliminated by the present invention.

Figure 4:
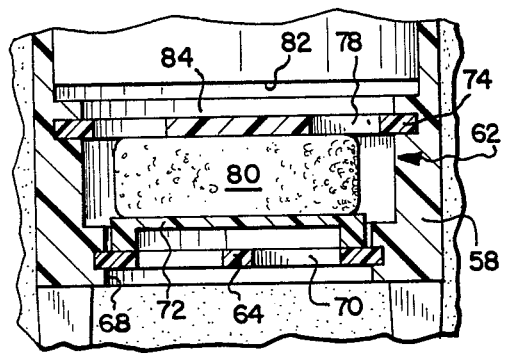
FIG. 4 is a detail of the inlet valve shown in FIG. 2 in which the valve is in a closed position.
Figure 5:
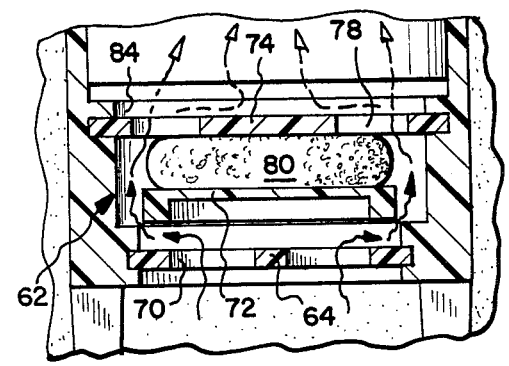
FIG. 5 is a detail of the inlet valve of FIG. 2 in which the valve is in an open position.

Subsequent to the backwashing cycle of the water softener the treatment material 32 is regenerated during a brining cycle. The valve mechanism 16 is actuated to direct a brine solution from the brine tank 12, through the brine supply line 23 and inlet line 18 to the pressure tank 10, where it flows downwardly through the treatment material 32 and out the outlet line 22 to the drain line 20. During the brining cycle the pressure in the tank 10 is substantially less than the pressure in the tank during the normal softening mode of operation. As a consequence, the inlet valve 62 to the reverse osmosis unit 34 assumes a closed position, as shown in FIG. 4. The pressure of the brine solution is insufficient to force the imperforate disk 72 upwardly away from the lower perforated disk 64 and compress the resilient member 80 against the upper perforated disk 74. Thus, the brine solution is not permitted to enter the inlet valve 62. This is desirable since the quality of the treated water produced by the unit 34 when supplied with a brine solution would be less than the quality of the treated water which is produced by the unit 34 during the normal softening mode of operation of the system.

The spirally wrapped membrane element 36 is preferably of well-known design, and the top and bottom caps 88 and 58 preferably are made of a material such as a plastic which does not react with the hard water or brine solution. The membrane element 36 and caps 58 and are sized such that they may be inserted through the access opening 24 into the bed of treatment material 32 and thereby not require the removal of the closure 14 for insertion or removal. Although the preceding description describes the invention as including a water softening pressure tank having a single membrane element mounted within it, it is within the scope of the invention to include a plurality of such membrane elements, each having waste water conduits and collection conduits passing through a plug threaded into the access opening of the pressure tank.

While the system herein described constitutes a preferred embodiment of the present invention, it is to be understood that the invention is not limited to this precise form of apparatus and that changes may be made therein without departing from the scope of the invention.

What is claimed is:

1. A water softening and treatment system comprising:
 a pressure tank;
 an inlet line for conveying raw water to said pressure tank;
 an outlet line for conveying softening water from said tank;
 a quantity of particulate treatment material located within said pressure tank for softening raw water within said tank;

at least one semi-permeable reverse osmosis membrane element means, positioned within said pressure tank, for filtering water; and means for collecting treated water from said membrane element means.

2. The system of claim 1 wherein said membrane element means includes means for conveying waste water bearing impurities from within said membrane element means to a drain.

3. The system of claim 1 wherein said membrane element means comprises:

a central perforate tube communicating with said means for collecting treated water;

a semi-permeable reverse osmosis membrane assembly spirally wrapped about said tubular member to form a generally cylindrical shape said membrane assembly including a pair of reverse osmosis membrane layers on either of a water permeable layer in fluid communication with said porous tubular member;

a spacing member separating successive layers of said spirally wrapped membrane assembly; and a bottom cap covering an end of said membrane element means and including inlet valve means for selectively permitting flow from said tank along said spacing member.

4. The system of claim 3 wherein said membrane element means further comprises a top cap covering an opposite end of said membrane element means and defining a waste plenum for collecting waste water bearing impurities which has passed through said inlet valve means and said spacing member.

5. The system of claim 4 further comprising means communicating with said top cap for conveying said waste water from said waste plenum to a drain.

6. The system of claim 5 wherein said inlet valve means comprises:

a lower perforated disk mounted in a lower end of said bottom cap;

an imperforate disk superposed to said lower disk and movable in a vertical direction to cover or uncover said lower disk;

an upper perforated disk mounted in said bottom cap and superposed to said imperforate disk, said upper disk and said membrane assembly defining an inlet plenum therebetween; and resilient means positioned between said upper perforated disk and said imperforate disk for urging said imperforate disk downwardly, said imperforate disk covering said lower perforated disk when the pressure of the water in said tank is below a predetermined fluid pressure.

7. The system of claim 6 wherein said means for collecting includes:

a holding tank located remotely from said pressure tank;

a collection conduit communicating with said central perforate tube and said holding tank; and fill regulating means for regulating water flow into said holding tank.

8. The system of claim 7 wherein said bottom cap includes means for supporting said membrane element means within said tank.

9. In a water softening system of the type having a pressure tank, an inlet line for conveying hard water to said pressure tank, an outlet line for conveying softened water from said tank, and treatment material located within said tank, a reverse osmosis treatment system comprising:

at least one semi-permeable reverse osmosis membrane element means positioned within said pressure tank, said membrane element means including a spirally wrapped semi-permeable reverse osmosis membrane assembly, means forming an inlet valve to said membrane element means for selectively regulating fluid flow into said membrane element means, and means forming a waste plenum for receiving waste water bearing impurities which flow through said membrane element means and said inlet valve;

means for conveying filtered fluid from said membrane element means; and means for conveying waste water from said waste plenum.

* * * * *